United States Patent [19]

Anderson, Jr.

[11] Patent Number: 5,071,320

[45] Date of Patent: Dec. 10, 1991

[54] CONTROL SYSTEM AND METHOD FOR CHEMICAL INJECTORS

[75] Inventor: Herbert E. Anderson, Jr., Muskogee, Okla.

[73] Assignee: BAHM, Inc., St. Louis, Mo.

[21] Appl. No.: 484,267

[22] Filed: Feb. 26, 1990

Related U.S. Application Data

[62] Division of Ser. No. 266,885, Nov. 3, 1988, Pat. No. 4,913,180.

[51] Int. Cl.⁵ ............................................. F04B 13/00
[52] U.S. Cl. ......................................... 417/53; 92/13.1
[58] Field of Search ................. 417/53, 212, 214, 216; 92/13.1, 13.6; 251/285, 268; 137/1

[56] References Cited

U.S. PATENT DOCUMENTS

| | | | |
|---|---|---|---|
| 2,090,069 | 8/1937 | Richardson et al. | 137/101.31 |
| 2,576,747 | 11/1951 | Bryant | 92/13.6 X |
| 2,675,758 | 4/1954 | Hughes . | |
| 3,080,852 | 3/1963 | Geyer | 92/13.1 |
| 4,141,383 | 2/1979 | Geimer | 251/285 X |
| 4,167,896 | 9/1979 | Clements | 92/13.2 |
| 4,368,754 | 1/1983 | Roberts | 251/268 X |
| 4,420,393 | 12/1983 | Smith | 417/218 X |

*Primary Examiner*—Stephen M. Hepperle
*Attorney, Agent, or Firm*—Senniger, Powers, Leavitt & Roedel

[57] ABSTRACT

A control system and method for chemical injectors includes a controller which outputs multiple feed set point signals and associated driver signals, each set point signal defining a desired injection capacity for a chemical injector and the associated driver designation signal designating the injector to receive the set point signal. A driver assembly is associated with each injector. The driver assembly receives a capacity signal from the injector which defines the volumetric injection capacity of the injector, compares the capacity signal to the feed set point signal, and outputs a drive signal to adjust the volumetric injection capacity of the injector. An adjustment assembly is provided for receiving the drive signal and positioning a stop to limit the reciprocal motion of the piston of the injector, thereby adjusting the volumetric injection capacity of the injector. The injectors inject into a common carrier fluid, such as irrigation water, and the carrier fluid, through a carrier fluid flow operated valve, is also used to reciprocate the injector pistons. A disabling assembly is provided to disable the driver assemblies when the pistons of the injectors are forced against the stops.

6 Claims, 7 Drawing Sheets

CONTROL SYSTEM AND METHOD FOR CHEMICAL INJECTORS

This is a division of application Ser. No. 266,885, filed Nov. 3, 1988, now U.S. Pat. No. 4,913,180.

BACKGROUND OF THE INVENTION

This invention relates to chemical injector control systems and more particularly relates to a control system which may control multiple injectors injecting multiple chemicals into a common process.

Chemical injection control systems and methods have been known in the art for sometime. Typically, in agricultural chemical injection control systems, two chemical supply tanks are used. Each tank contains a premixed blend of chemicals (typically nutrients or fertilizers). Two tanks are used to separate chemical blends containing chemicals which will not mix or blend together (i.e. will not remain in suspension) or which will undesirably react to one another. A pump (typically a centrifugal pump) and a control valve are provided on an outlet of each chemical supply tank. A downstream sensor is used to send a feedback signal, indicative of the effect of the injected chemicals, to the controller. In typical prior art agricultural systems, the sensor senses conductivity. The controller regulates the flow of chemicals through the pumps and control valves into the process. Normally the chemicals are injected into irrigation water. Shortcomings of the prior systems include: they are feedback systems, i.e., they measure the effect of the injected chemicals on the process before making adjustment; a downstream sensor malfunction may destroy the process; the lag time required for the process to react to the injection chemical and for the downstream sensor to measure the reaction; if a pump or control valve on the outlet on one of the chemical supply tanks fails and shuts off the tank, the controller may open the control valve on the other tank to try to compensate for the demand of the sensor, which will result in overdosing the agricultural process With the chemicals contained in one tank; the user must either mix chemicals into two blends (one blend for each tank) or buy pre-blended chemicals and must use the contents of a tank before changing the blend in the tank, therefore the user cannot change the blend in a tank instantaneously to satisfy the changing needs of an agricultural process.

SUMMARY OF THE INVENTION

Accordingly, it is an advantage of the chemical injector control system and method of the present invention to provide remote control of the volumetric injection capacity of chemical injectors.

It is an advantage of the present invention provide a chemical injector control system and method which allows remote control of the individual volumetric injection capacities of multiple injectors where each injector injects a distinct chemical into a common carrier fluid or process.

It is an advantage of the present invention to provide a chemical injector control system and method which provides a controller for adjusting the injector's volumetric injection capacity in response to a set point signal to the controller, and which provides a supervisory system for monitoring the controller set point and the proper adjustment of the volumetric injection capacities to satisfy the set point.

It is an advantage of the present invention to provide a chemical injection control system and method which controls the volume and concentration, as well as the rate, of chemical injection.

It is an advantage of the present invention to provide a chemical injection control system and method which injects chemicals directly into the carrier fluid feed stream to the process.

It is an advantage of the present invention to provide a chemical injection control system and method which disables chemical injection when a carrier fluid, such as irrigation water, is not flowing in order to minimize the possibility of chemical overdose or underdose.

It is an advantage of the present invention to provide a chemical injection control system and method which, before starting operation after a period of power loss or shutdown, adjusts the set point of the controller for each injector equal to the existing volumetric injection capacity of the injector to prevent adjustment of the injectors until new set points are entered and to minimize the possibility that the system will start up with the injectors injecting chemical at an undesirable rate.

It is an advantage of the present invention to provide a chemical injection control system and method which eliminates the need for a downstream sensor and a feedback control signal and the attendant lag time and the potential for sensor failure disrupting the chemical process.

It is an advantage of the present invention to provide an agricultural chemical injection control system and method in which each distinct chemical is injected into the process by a separate injector.

It is an advantage of the present invention to provide an agricultural chemical injection control system and method which does not require the use of mixed or blended chemicals, nutrients, fertilizers, etc.

It is an advantage of the present invention to provide a chemical injection control system and method in which the injection rates of a multiplicity of distinct chemicals can be instantaneously and individually adjusted for each distinct chemical in order to satisfy the immediate needs of an agricultural process.

Accordingly, the present invention provides a control system and method for chemical injectors, which includes a processor means, capacity signal means, and driver means. The processor means provides a feed set point signal defining an amount of chemical to be injected. The capacity signal means sends an interrogation signal to the injector and generates a capacity signal defining the volumetric injection capacity of the injector. The driver means, in response to the feed set point signal and the capacity signal compares the capacity of the injector to the amount of chemical to be injected and generates a drive signal to adjust the volumetric injection capacity of the injector until the capacity signal is about equal to the feed set point signal. The control system may also include adjustment means, responsive to the drive signal, for adjusting the volumetric injection capacity of the injector. The adjustment means includes capacity measuring means, responsive to the interrogation signal, for measuring the volumetric capacity of the injector and providing the capacity signal.

In a preferred embodiment, the control system includes a plurality of drive means, each drive means being associated with an injector, and the processor means generates a drive designation signal associated with the feed set point signal for designating the driver means to receive the feed set point signal. Gate means are also included for enabling the driver means to receive the feed set point signal only when the driver means is designated by the drive designation signal. More preferably, the processor means generates a plurality of feed set point signals and a plurality of driver designations signals, each feed set point signal having an associated driver designation signal. This allows each driver means to be associated with an injector injecting a distinct chemical. Each feed set point signal and associated driver designation signal may then be used to indicate an amount of a distinct chemical to be injected and designate the driver means and injector injecting such chemical.

In a preferred embodiment, the injector includes a cylinder-like housing having a cavity and reciprocal piston-like element defining the cavity into an injection chamber and a complement chamber. The adjustment means includes a stop means, located in the path of reciprocal motion of the piston-like element, for limiting the reciprocal motion and thereby limiting the available volume of the injection chamber and the volumetric injection capacity of the injector. The adjustment means also includes power means, such as an electric motor, which responds to the drive signal to adjust the position of the stop means along the path of the reciprocal motion in order to adjust the volumetric injection capacity of the injector.

BRIEF DESCRIPTION OF THE DRAWINGS

The present invention will be better understood by the reference to the examples of the following drawings.

DETAILED DESCRIPTION OF THE PREFERRED EMBODIMENTS

Figure 1:
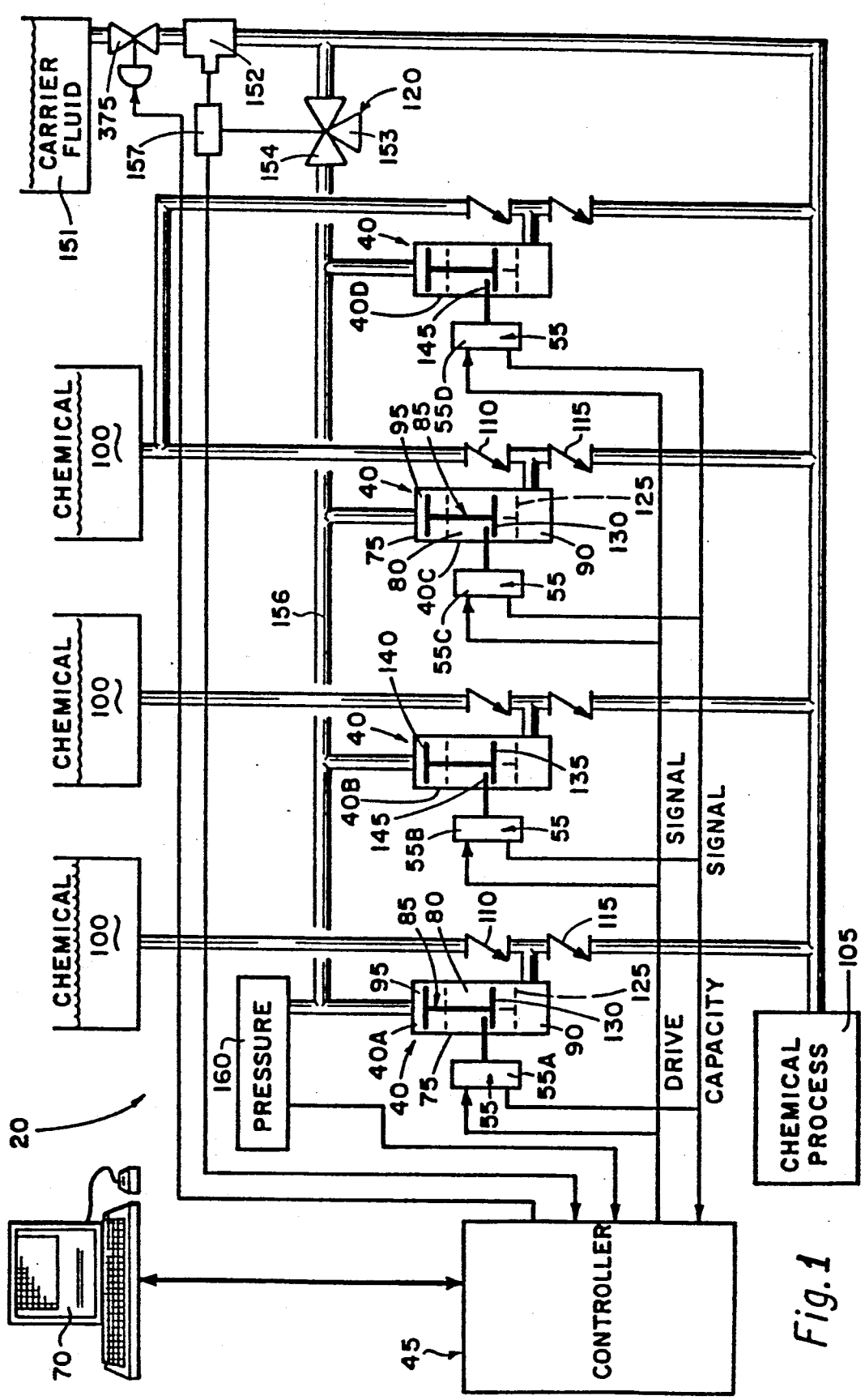
FIG. 1 is a schematic block diagram of an embodiment of the control system and method for chemical injectors of the present invention.

Before explaining the present invention in detail, it is intended to be understood that the invention is not limited to the details of construction and arrangement of parts illustrated in the accompanying drawings, since the invention is capable of other embodiments and of being practiced or carried out in various ways commensurate with the claims herein. Also, it is intended to be understood that the phraseology or terminology employed herein is for the purpose of description and not of limitation.

FIGS. 1-8 present preferred embodiments of the chemical injection control system and method, generally designated 20, of the present invention. Referring to the example of FIGS. 2 and 3B, the invention may be generally described as being comprised of processor means 25, capacity signal means 30, and driver means, generally designated 35. The processor means 25 provides a feed set point signal which defines an amount of chemical to be injected. The capacity signal means 30 sends an interrogation signal to an injector, generally designated 40, and generates a capacity signal which defines the volumetric injection capacity of the injector 40. The driver means 35 receives the feed set point signal and the capacity signal and compares them, in order to compare the capacity of the injector 40 to the amount of chemical to be injected, and generates a drive signal to adjust the capacity of the injector 40 until the capacity signal is about equal to the feed set point signal.

The processor means 25, capacity signal means 30, and driver means 35, as well as the other components of the system to be discussed infra, may be discrete elements of a pneumatic system, an electronic or hard wired electrical circuit, embodied in multiple integrated electronic circuits, computer software, or any combination of the preceding options. Preferably, they are at least partially implemented with a computer program combined with digital electronic circuitry. Referring to example FIGS. 2 and 3B, in the preferred embodiment, the processor means 25, capacity signal means 30, and driver means 35 are components of a standardized component system which, for purposes of simplifying this description and discussion are collectively called the "controller", generally designated 45, and best seen in FIGS. 1 and 2.

Figure 2:
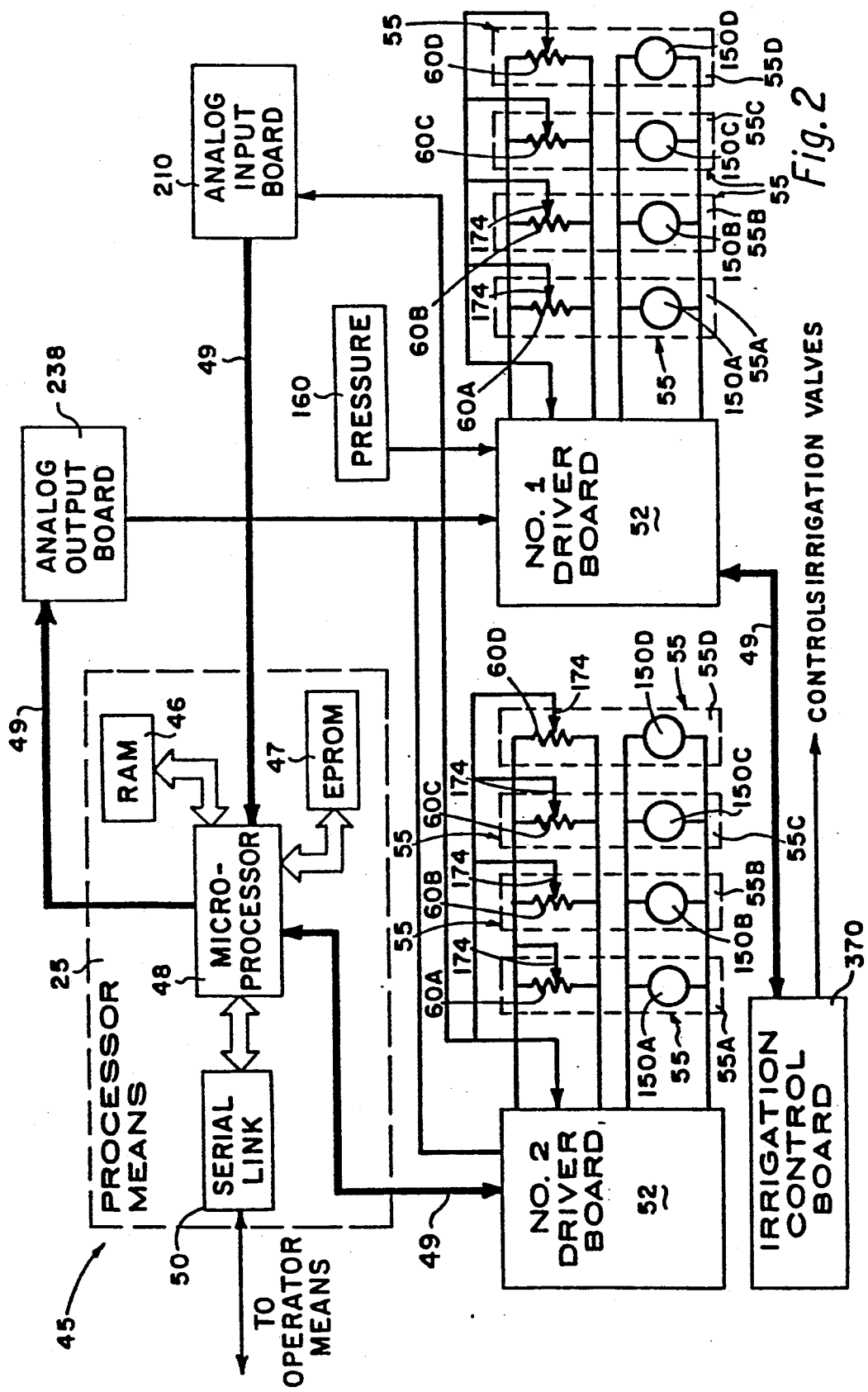
FIG. 2 is a schematic block diagram of an embodiment of the controller shown in FIG. 1.

Referring to FIG. 2, the preferred controller 45 was assembled using the commercially available STD BUS system. The STD BUS is an industry standard defined by the STD Manufacturers Group (STDMG) in the "STDMG STD BUS Specification and Practice" (Document #10689E, 10/84), Section 1 of which is incorporated herein by reference thereto. Section 1 includes the STD BUS specifications. The STD BUS system is one in which multiple boards are plugged into a card cage (not illustrated) and communicate using a common bus system. Each board has a specific function. For example, the prototype processor means 25 is a commercially available, model CPU-9, made by Computer Dynamics. The prototype processor means 25 includes 8K (nominally 8,000 bytes) RAM 46 (Random Access Memory) for variable storage, 32K (nominally 32,000 bytes) EPROM 47 (Eraseable Programmable Read Only Memory) for program storage, and a microprocessor 48. The processor means 25 is known in the industry as a single board computer. The processor means 25 runs the control system 20 and includes the control program further discussed infra. The processor means 25 allows the boards to communicate using the common STD bus 49 (the common "STD" bus 49 is illustrated using heavy lines in FIG. 2 to distinguish the bus from non-bus wiring) and enables or disables bus communication by a specific board using an encoded address signal. Each board has a decoder which will allow access to and enablement of the board only on receipt of the properly encoded address signal. Thus, the processor means 25 controls the timing of communications between the boards of the controller 45 and between the controller 45 and components of the system 20 outside the controller 45. The processor means 25 also has a serial input/output port 50, or serial link, which is preferably a conventional RS232C serial link, which may be used to communicate with another computer The processor means 25 uses English language commands to communicate, so the system 20 can be controlled manually using a typical keyboard input terminal, as further discussed infra.

Figure 3A:
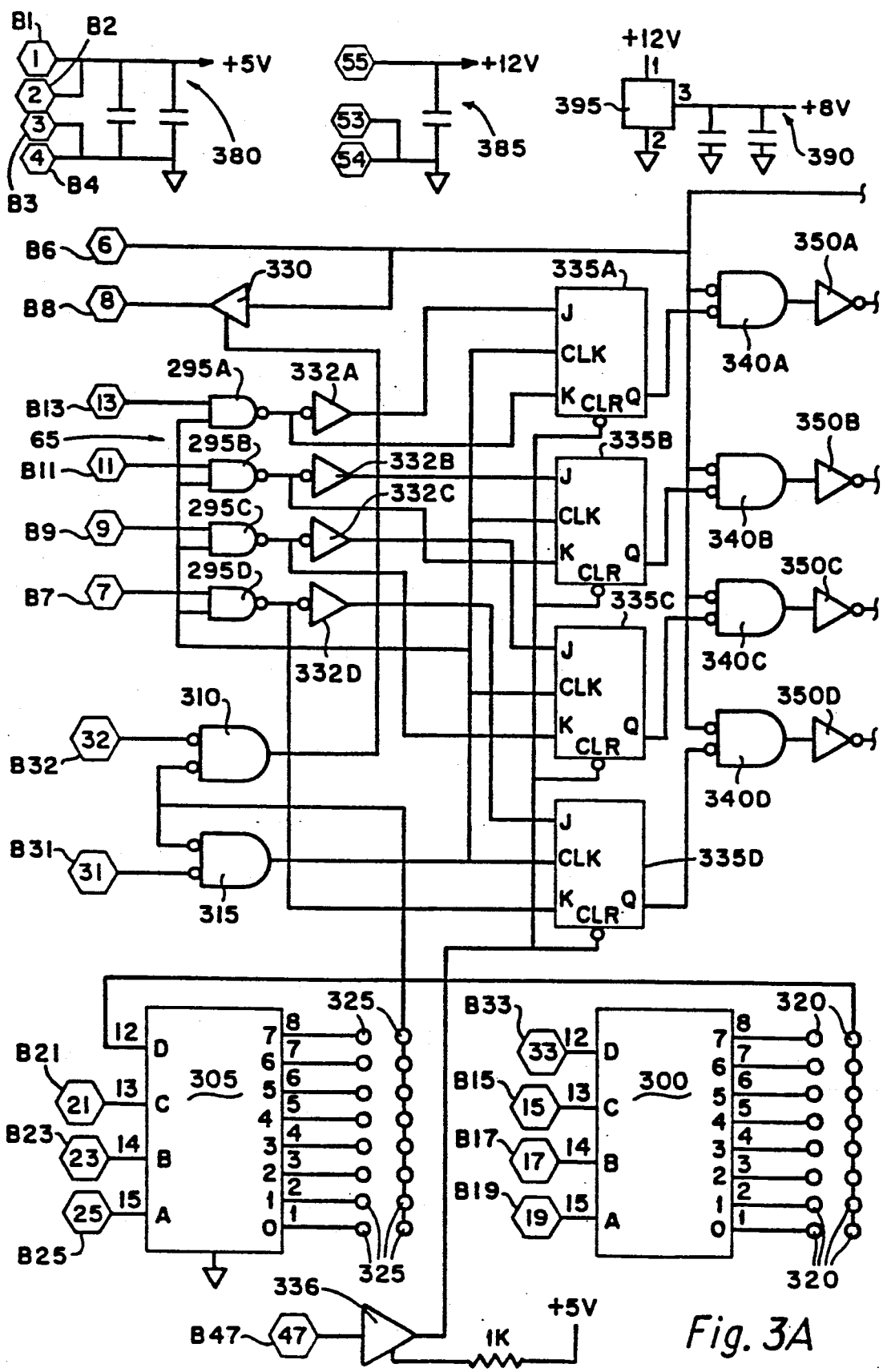
FIGS. 3A and 3B are respectfully the left and right portions of a circuit diagram of an embodiment of the driver boards shown in FIG. 2.
Figure 3B:
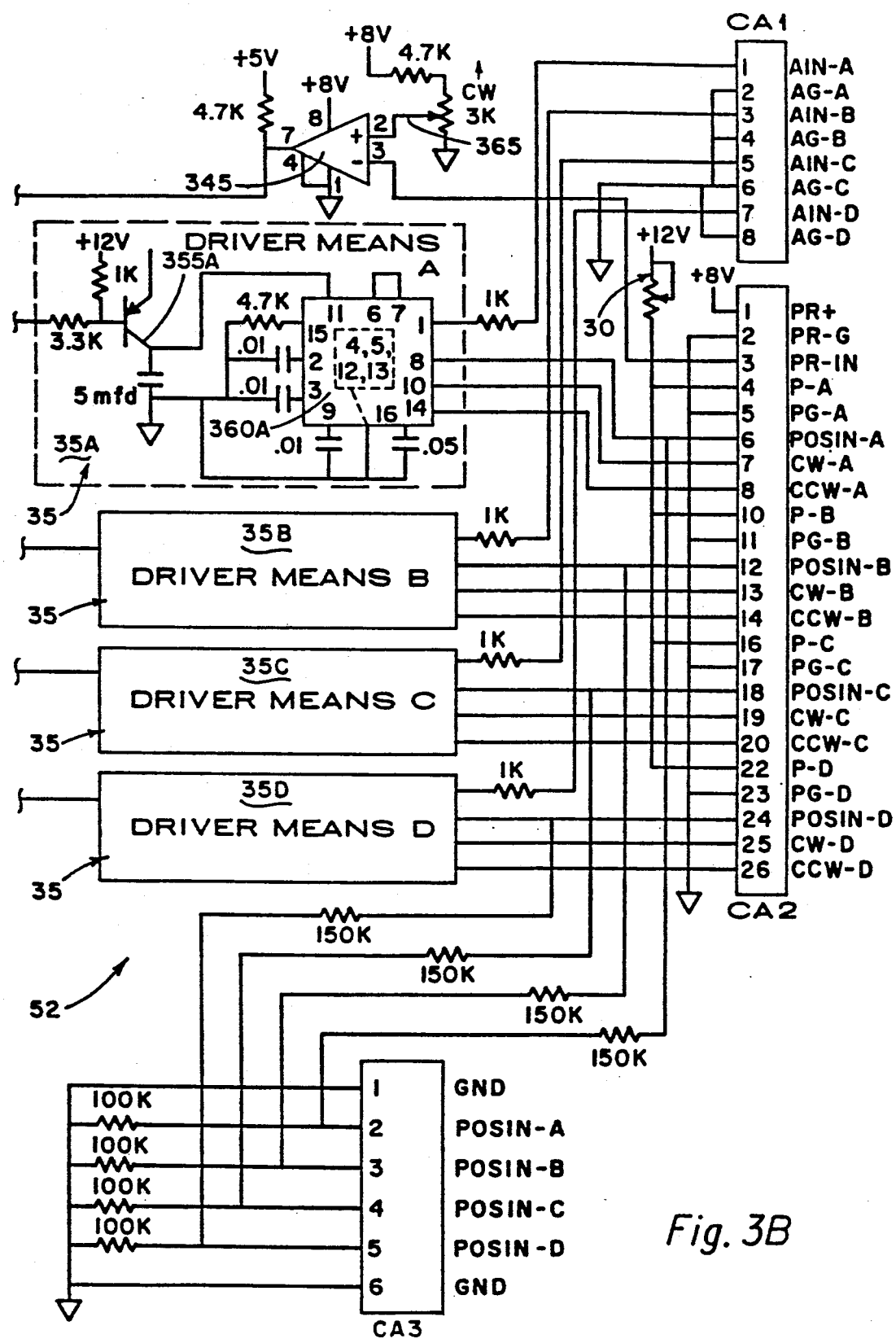

Referring to example FIGS. 3A and 3B, in the preferred embodiment, the driver means 35 is a component of a driver board, generally designated 52, which is also a board which will plug into the STD bus system card cage. The driver board 52, which was developed by the inventor, is built on a Micro Link model STD-130 development card. Each prototype driver board 52 can accomodate up to four driver means 35 adjusting four injectors 40, as further discussed infra. As exemplified in FIG. 3B, in the preferred embodiment, the capacity signal means 30 is a variable power or voltage source and the driver means 35 is basically a servo circuit, as further discussed infra. The controller 45 also includes a power supply board, not illustrated, which is a Power General model 4045-3 in the prototype control system 20.

Figure 4:
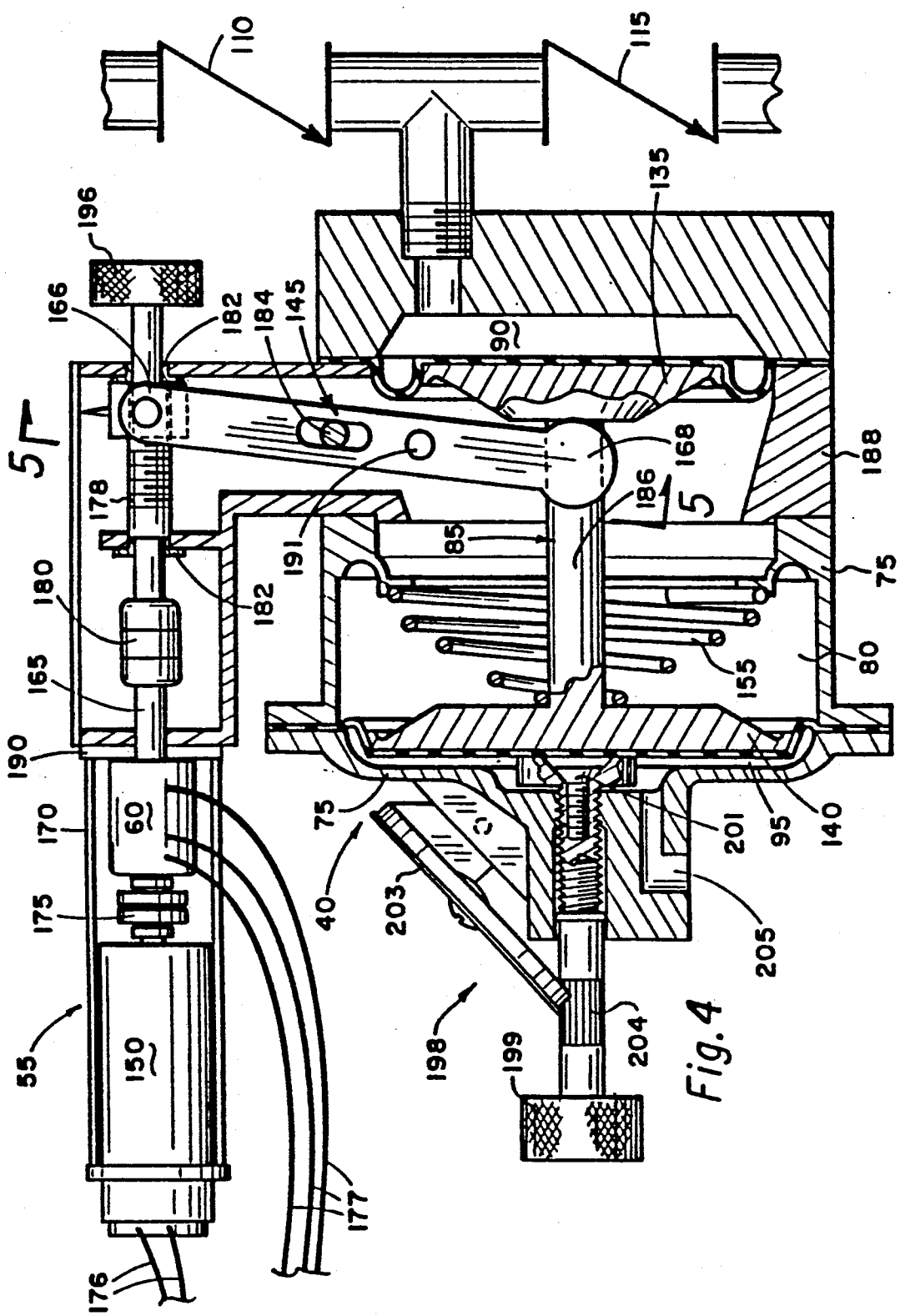
FIG. 4 is a sectional view of an embodiment of the injector and adjustment means of the present invention.

Referring to the example of FIGS. 1 and 4, in the preferred embodiment, the control system 20 also includes adjustment means, generally designated 55, for adjusting the volumetric injection capacity of an injector 40 in response to the drive signal from the driver means 35. The adjustment means 55 preferably includes capacity measuring means 60 for measuring the volumetric injection capacity of the injector 40 and providing the capacity signal in response to the interrogation signal from the capacity signal means 30. The capacity signal means 30 may be an integral part of the capacity measuring means 60 or may be an independent device. In the prototype system 20, the capacity signal means 30 is a component of the driver board 52, as discussed supra. The capacity signal means 30 and interrogation signal may take any form which will send an enabling signal to the injector 40 and enable the injector 40 or adjustment means 55 to transmit a capacity signal indicative of the volumetric injection capacity of the injector 40 to the driver means 35. The controller 45 and adjustment means 55 may be used independently of one another or in combination. Preferably, they are used in combination, as discussed infra.

As exemplified in FIG. 3B, in the preferred embodiment, the control system 20 includes a plurality of driver means 35, each driver means 35 being associated with an injector 40, i.e., each driver means 35 adjusts the capacity of a specific injector 40 and only that injector. The processor means 25 generates a driver designation signal which is associated with the feed set point signal for designating the driver means 35 to receive the feed set point signal, i.e., the driver designation signal is assigned to and identifies the feed set point signal. Preferably, each driver board 52 includes gate means, generally designated 65, for enabling the driver means 35 to accept the feed set point signal only when the driver means 35 is designated by the driver designation signal, as further discussed infra. The gate means 65, as the other switches of this system, may be any type of electronic, mechanical, or fluidically operated screening or switching device, such as solenoid or pilot actuated relays, pneumatic logic components, etc., which are operably compatible with the other components of the control system 20. Preferably, the gate means 65 are nand gates or electronic equivalents compatible with the driver designation signal.

In the preferred embodiment, the processor means 25 generates a plurality of feed set point signals and a plurality of driver designation signals. Each feed set point signal has an associated driver designation signal. Therefore, the processor means 25 can simultaneously provide set points for controlling the volumetric injection capacity of multiple injectors and designate or define which injector 40 is to receive which feed set point signal. When the control system 20 is used with a multiple chemical injection system, as exemplified in FIG. 1, each driver means 35 may be associated with an injector 40 injecting a distinct chemical and each feed set point signal and associated driver designation signal may define an amount of distinct chemical to be injected and designate the driver means 35 and injector 40 injecting such chemical.

Since the controller 45 includes processor means 25, and processor means 25 includes a microprocessor 48, memory 46, 47, and serial interface 50, the controller 45 has the capability of performing complex operations. It can be programmed to function as a stand-alone system in which information as to which chemical corresponds to which injector 40, the volumetric injection capacity and range of each injector 40, the rate at which the injectors 40 stroke or inject chemical, at what concentration each chemical is, etc. may be programmed. The controller 45 may also be programmed to accept additional inputs relating to the parameters of the chemical process being controlled and to use this information together with the information related to the injectors 40 to calculate a set point for each injector 40 and to use the adjustment means 55 to adjust the capacity of the injector 40 accordingly. For example, the control system 20 may be used to control the supply of nutrients to plants. The controller 45 may function as a stand-alone system by adding analog inputs for light, humidity, temperature, soil acidity and nutrient content and other parameters to compute the required rates of feed for any number of chemical elements, such as nitrogen, calcium, phosphorus, potassium, or other plant nutrients. The controller may also be programmed with data on the injectors 40, i.e., the chemical to water feed ratios of the injectors 40 (as further discussed infra), what nutrient or chemical each injector is injecting and at what concentration each chemical is. With this information, the controller 45 could then calculate at What position each injector should be set to feed the proper amount or rate of chemical to the plants.

At the present time, all such calculations are performed outside of the controller 45. As exemplified in FIG. 1, an operator means 70, such as a personal computer with a keyboard entry system 70, is used to input instructions as to which injectors 40 and adjustment means 55 should be adjusted and what the set point (desired volumetric injection capacity) is for each injector 40 to be adjusted. The operator means 70 generates a feed signal defining the set point for each injector 40 to be adjusted. The feed signal from the operator means 70 also carries information indicating the injector 40 to which the feed signal relates. In response to receiving the feed signal from the operator means 70, the processor means 25 generates the feed set point signal and the associated driver designation signal needed to enable the selected injector 40 to receive the feed set point signal.

The injector 40 may take any form of pump or injector in which the volumetric injection capacity may be adjusted. Preferably, the injector 40 is some form of reciprocating pump, also designated 40. Referring to the example of FIG. 1, in the preferred embodiment, the injector 40 comprises a cylinder-like housing 75 having a cavity 80. A reciprocal piston-like element, generally designated 85, divides the cavity 80 into an injection chamber 90 and a complement chamber 95. The injection chamber 90 is connected to a chemical source 100 and to the chemical process 105. In the preferred embodiment, as best seen in FIG. 1, an inlet check valve 110 is placed in the connection between the injection chamber 90 and the chemical source 100 in such a manner as to allow chemicals to flow from the chemical source to the injection chamber 90 but not from the injection chamber 90 to the chemical source 100. An outlet check valve 115 is placed in the connection between the injection chamber 90 and the chemical process 105 in order to allow chemical to flow from the injection chamber to the chemical process 105 and to prevent flow from the chemical process 105 into the injection chamber 90.

The preferred control system 20 also includes engine means, generally designated 120, for reciprocating the piston-like element 85 along a path of reciprocal motion between a post-injection position 125 in which the injection chamber 90 is of reduced volumetric injection capacity and a pre-injection position 130 in which the injection chamber 90 is of enlarged volumetric injection capacity. As the piston-like element travels from the post-injection position 125 to the pre-injection position 130 chemical is drawn into the injection chamber 90 through inlet check valve 110. As the piston-like element 85 travels from the pre-injection position 130 to the post-injection position 125 chemical is injected into the chemical process 105 through the outlet check valve 115.

In the preferred embodiment, as exemplified in FIG. 4, the injector 40 is a double-diaphragm pump, also designated 40, which has an injection diaphragm 135 and a complement diaphragm 140. The injection diaphragm together with the housing 75 defines the injection chamber 90 and the complement diaphragm 140 together with the housing 75 defines the complement chamber 95.

Referring to example FIG. 4, the adjustment means 55 includes stop means, generally designated 145, located in the path of reciprocal motion of the piston-like element 85, for limiting the reciprocal motion of the piston-like element 85 and thereby limiting the available volume of the injection chamber 90 and limiting the volumetric injection capacity of the injector 40. The adjustment means 55 also includes power means 150 for reciprocal motion in response to the drive signal from the driver means 35 and thereby adjusting the volumetric injection capacity of the injector 40.

As discussed supra, engine means 120 is used to reciprocate the piston-like element 85. The engine means 120 may be a reciprocating engine or other reciprocating device or force capable of reciprocating the piston 85. Preferably, the engine means 120 includes valve means, also designated 120, for alternately applying pressurized fluid to and exhausting pressurized fluid from the complement chamber 95 in order to reciprocate the piston-like element. In the preferred embodiment, referring to example FIG. 1, a source 151 of pressurized carrier fluid is connectable to the outlet of the injection chamber for carrying injected chemicals to the chemical process 105. Also in the preferred embodiment, the valve means 120 is connected to the carrier fluid source 151 and to the complement chamber 95 for alternately applying carrier fluid to the complement chamber and exhausting carrier fluid from the complement chamber 95. The carrier fluid source 151 should have sufficient pressure to move the piston 85 from the pre-injection position 130 to the post-injection position 125.

In the preferred embodiment, the engine means 120 is a flow-actuated valve 120. The carrier fluid flows through a flow meter 152 and the meter 152, through appropriate gearing, rotates a cam 157 proportionately to the carrier fluid flow. The cam 157 operates the valve 120 which controls the application of the carrier fluid to the complement chamber 95. As the cam 157 rotates, it first disconnects the exhaust port 153 of the valve 120 from the complement chamber 95 and then connects the pressure port 154 of the valve to the complement chamber 95. As the pressure port 154 opens, the carrier fluid is connected to the complement chamber 95 through the pressure port and pressurizes the complement chamber 95 which expands the size of the complement chamber 95, reduces the size of the injection chamber 90, and forces chemical into the carrier fluid through the outlet check valve 115. As the cam 157 continues to rotate, the action reverses. First pressure port 154 is disconnected from the complement chamber 95 and then the exhaust port 153 is connected to the complement chamber 95. This allows the spring 155 in the injector 40 to move the diaphragms 135, 140 to reduce the size of the chamber 95 and enlarge the size of the injection chamber 90 thereby exhausting fluid from the complement chamber 95 through exhaust port 153 and drawing chemical into the injection chamber 90 through the inlet check valve 110. The valve 120 may be a three-way valve, as illustrated or may be two, two-way valves or equivalent. A flow-operated valve 120 is preferred since it provides a simple accurate way to add chemical to the carrier fluid, i.e., by knowing the volumetric injection capacity of the injectors 40 and the flow of carrier fluid required to cycle the valve 120 one time, the ratio of injected chemical to carrier fluid is known. Another advantage is that the gearing and/or cam of the flow operated valve may be changed to alter the injection rate of the injectors 40 to the flow of carrier fluid through meter 152. A flow operated valve 120 of this type is described in U.S. Pat. No. 3,288,071 which is incorporated herein by reference thereto. One flow-operated valve or engine means 120 and a manifold 156 may be used to operate multiple injectors 40, as exemplified in FIG. 1. Similarly, multiple flow-operated valves 120 and/or manifolds 156 may be used to operate multiple injectors injecting into multiple carrier fluid process feed streams, e.g., if the carrier fluid is split into multiple streams feeding different processes or zones of a process.

Referring to FIG. 1, preferably the control system 20 includes disabling means 160 for disabling the driver means 35 when the injector 40 is not injecting chemical. The disabling means 160 may be a switch which is operated by pressure in the injection chamber 90 or by the application of power to the piston-like element 85. Preferably, the disabling means 160 is a pressure sensor, also designated 160, responsive to pressure in the complement chamber 95 which generates a pressure signal indicative of the pressure in the complement chamber 95. The pressure signal is used to enable the driver means 35 when the complement chamber 95 is pressurized and disable the driver means 35 when the complement chamber 95 is not pressurized, as further discussed infra. The pressure sensor 160 may be mounted on manifold 156, as exemplified in FIG. 1, to allow one pressure sensor 160 to monitor multiple, commonly pressured complement chambers 95.

Referring to FIG. 4, preferably the power means 150 includes a reversible electric motor, also designated 150, having a shaft 165 rotated by the motor 150. Preferably, at least a portion of the length of the shaft 165 is threaded and the stop means 145 is threadingly engaged with the shaft 165. As discussed supra, in the preferred embodiment, the injector 40 is a double-diaphragm pump and the stop means 145 comprises an elongated bar, also designated 143, having a first end 166 threadingly engaged with the shaft 165 and a second end 168 extending between the diaphragms 135, 140 of the double-diaphragm pump 40, this bar being pivotable about a centrally located pivot pin 184. Referring to FIG. 4, the prototype adjustment means 55 includes a housing 170 for mounting the adjustment means 55 on the injector or double-diaphragm pump 40. The power means or electric motor 150 is mounted in the housing 170 and the shaft 165 extends from the motor 150. A clutch assembly 175 is connected between the motor 150 and the stop means 145 and allows the motor 150 to turn if the stop means 145 becomes blocked or immobilized while the motor 150 is energized. In the preferred embodiment, the capacity measuring means 60 is a potentiometer, also designated 60, which is connected to the power means 150. The wiper 174 (best seen in FIG. 2) of the potentiometer is moved along the resistive element of the potentiometer 60 as the potentiometer 60 is rotated by the motor shaft 165. The wiper 174 of the potentiometer 60 thus provides a variable resistor in which the value of the resistance is a function of the rotation of the motor shaft 165. The potentiometer can therefore be calibrated to give an accurate indication of the position of the stop means 145 (and the volumetric injection capacity of the injector 40) since the position of the stop means 145 is also a function of the rotation of the motor shaft 165. In the preferred embodiment, best seen in FIG. 3B, the capacity signal means 30 is a 12 volt dc (12 vdc) power source and the interrogation signal is a 12 vdc signal connected across the potentiometer 60. The capacity signal is obtained by connecting the wiper 174 to the driver means 35.

Referring to FIG. 4, in the prototype adjustment means 55, the housing 170 is generally cylindrically shaped. Electric motor 150 is installed in one end of the housing and includes wiring 176 and associated connectors for carrying the driver signal to the motor 150 from the driver means 35. Clutch assembly 175 is connected to the output of the motor 170 and placed between the motor 170 and potentiometer 60. The potentiometer wiring 177 is used to carry the interrogation signal to the potentiometer 60 from the capacity signal means 30 and to carry the capacity signal from the wiper of potentiometer 60 to the controller 45. The motor shaft 165 extends from the potentiometer 60 and includes threads 178 along a portion of the shaft. The flex coupling 180 in the shaft 165 is provided to allow for any misalignment between the threaded portion of the shaft 165 and the portion of the shaft 165 extending from the potentiometer 60. The flex coupling 180 also allows the shaft 165 to be separated at the coupling 180 for maintenance, calibration, etc., i.e., the flex coupling 180 disconnectably couples the threaded portion of the shaft 165 to the portion extending from potentiometer 60. Supports or bearings 182 are provided along the length of the shaft 165 to support the shaft 165 in proper position.

As discussed supra, the preferred stop means 145 is an elongated bar having a first end 166 threadingly engaged with the shaft threads 178 and a second end 168 extending between the diaphragms 135, 140 of the double-diaphragm pump 40. In the preferred embodiment, the stop means 145 is used to obstruct the reciprocal motion of the injection diaphragm 135 and therefore the second end 168 of the stop means 145 is positioned adjacent the injection diaphragm 135. Pivot pin 184 is located centrally in the length of the stop means 145 to increase the mechanical advantage of the stop means 145 in resisting motion of the injection diaphragm 135 and to pivotally translate the motion of the threads 178 and first end 166 of stop means 145 to the second end 168 of stop means 145. In the prototype double-diaphragm pump 40, the interconnecting shaft 186 between the diaphragms 135, 140 is lengthened to provide space between the diaphragms 135,140 for the second end 168 of the stop means as well as to accommodate the mounting of the adjustment means 55 to the injector 40. Annular spacer 188 is provided in the housing 75 of the double diaphragm pump 40 to accommodate lengthened shaft 186 and the adjustment means 55, i.e., space must be provided for the stop means 145 to enter the double-diaphragm pump 40.

Although the space between the diaphragms 135, 140 is normally not exposed to process fluids, the diaphragms 135, 140 may rupture and/or leak and the mounting of the adjustment means 55 to the double-diaphragm pump 40 should be properly sealed if it is desired to prevent process fluid leakage to the atmosphere. The pump 40 may also be vented, and the vent (not illustrated) may be routed as desired to dispose of leaking process fluid. Seal 190 is provided to isolate the motor 150, clutch assembly 175, and potentiometer 60 i.e., the electrified components, from the remainder of the adjustment means 55 and from possible exposure to fluids leaking through one of the diaphragms 135, 140.

Figure 5:
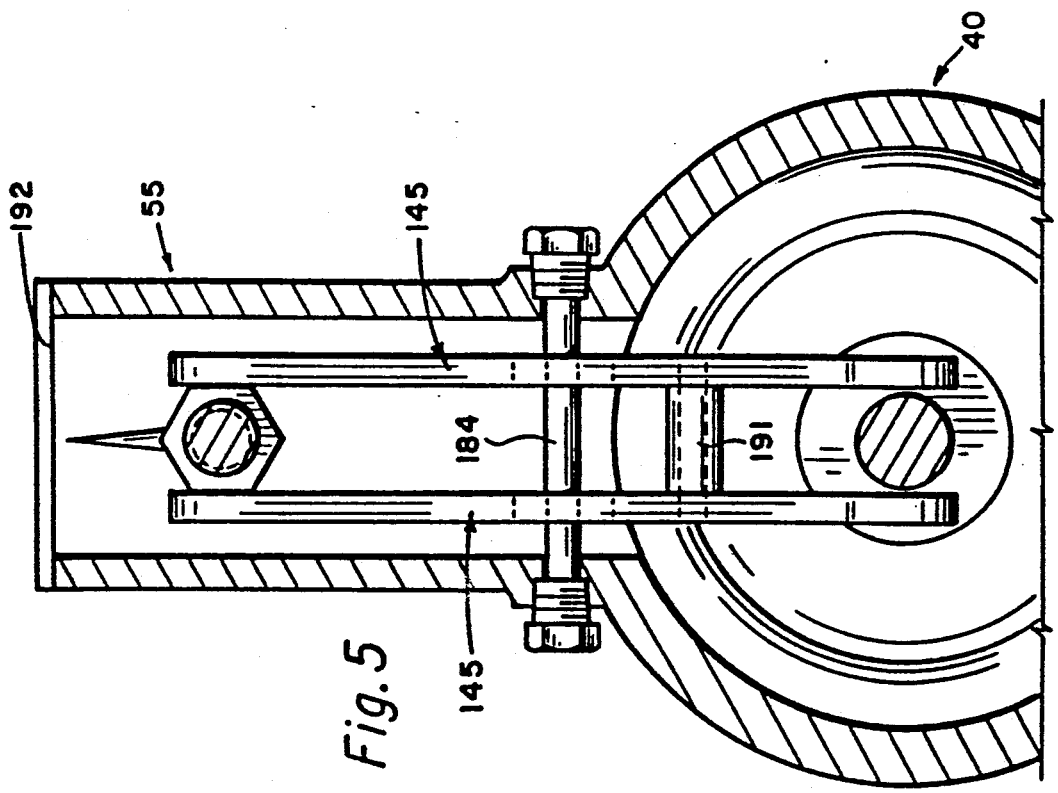
FIG. 5 is a view along 5-5 of FIG. 4.

Referring to FIG. 5, it is seen that the stop means 145 may be bifurcated to increase its structural strength and to accomodate the structural arrangment of the adjustment means 55. Spacer 191 is provided to maintain proper separation and structural integrity between the bifurcated sections of stop means 145, i.e., spacer 191 both spaces the bifurcated sections apart on either side of shaft 186 and fastens them together. A window 192 may be provided adjacent a scale (not illustrated) on the surface of the adjustment means housing 170 which together with pointer 194 mounted on the first end 166 of the stop means 145 allow a visual indication of the volumetric injection capacity of injector 40 at the location of the injector 40.

Calibration knob 196 is connected to the shaft 165 for manually rotating the shaft 165 in order to calibrate the adjustment of the adjustment means 55, i.e., to calibrate the range of the capacity signal with the range of available motion of the stop means 145 so that, for example, when the potentiometer 60 is sending a capacity signal corresponding to fifty percent of the range of the potentiometer 60 the stop means 145 is positioned to restrict the available volumetric injection capacity of the injector 40 to fifty percent of maximum capacity. In the prototype proper calibration is effected by loosening flex coupling 180 so that the motor 150 will not turn the threads 178. A 100 percent or maximum capacity drive signal is then sent to motor 150 which drives the shaft 165 to turn the potentiometer 60 until the potentiometer 60 sends a capacity signal telling the driver means 35 that the potentiometer 60 is at 100 percent of its range. The calibration knob 196 is then used to turn the threaded portion of shaft 165 until the stop means 145 is positioned to allow injection diaphragm 135 to fully stroke, i.e., so that each stroke of the injection diaphragm injects the full capacity of injection chamber 90. The flex coupling 180 is then tightened up to connect the threaded portion of the shaft 165 to the portion extending from the potentiometer 60 so that the motor 150 will turn threads 178 and drive the stop means 145. The calibration knob 196 may be replaced with a screwdriver slot to reduce tampering with the calibration of the adjustment means 55. Any attempt to adjust the calibration of the adjustment means 55 when the associated driver means 35 is enabled and the shaft 165 is coupled at flex coupling 180 will result in the driver means immediately moving the stop means 145 back to the set point.

Referring to the example of FIG. 4, in the preferred embodiment, the double diaphragm pump or injector 40 includes manual adjustment means 198 for manually adjusting the volumetric injection capacity of the pump or injector 40. The adjustment means 198 also functions as a means for limiting the maximum available volumetric injection capacity of the injector 40. The manual adjustment means 198 includes a manual adjustment knob 199 mounted on one end of shaft 200. Pad 201 is mounted at the other end of shaft 200. Shaft 200 is threadably engaged with housing 75 and as shaft 200 is rotated with knob 199 the pad 201 is extended into or withdrawn from the path of reciprocal motion of complement diaphragm 140. Indicating dial 203 is threadably engaged with threads 204 on shaft 200 and the dial 203 is calibrated to indicate the position of pad 201 in the path of reciprocal motion of the diaphragms 135, 140. For example, if the dial 203 indicates that the pad is at position "10" the pad 201 is positioned so that it does not restrict motion of the diaphragms 135, 140, i.e., the injector 40 may inject its full or maximum volumetric injection capacity with each stroke. If the dial 203 indicates that the pad 201 is at position "5" the pad 201 is positioned to limit the motion of the diaphragms 135, 140 so that the volumetric injection capacity of the injector 40 is limited to fifty percent of its maximum volumetric injection capacity. Complement port 205 is used for connecting the complement chamber 95 to the engine means 120.

As discussed supra, in the preferred embodiment, the processor means 25 includes a serial input/output port or serial link 50 which allows communications with the operator means 70. The operator means 70 may be another computer or simply a typical computer entry terminal with communications software and having a keyboard and printer or cathode ray tube, also designated 70. As discussed supra, the processor means 25 also includes a microprocessor 48,8K (nominally 8,000 bytes) of RAM 46 (random access memory) for variable storage, and 32K (nominally 32,000 bytes) of EPROM 47 (erasable programmable read only memory). As discussed supra, the processor means 25 is programmed to accept a feed signal from the operator means 70 and to generate a feed set point signal for adjusting the volumetric injection capacity of the injectors 40. The method or program which the processor means 25 uses to control the injectors 40 was developed using Computer Dynamics' CDI multitasking compiled basic language on Computer Dynamics' standard development system. The control program or method consists of a lead task and at least two subtasks which run independently of each other, but interact with each other through shared variables as further discussed infra.

Figures 6, 7:
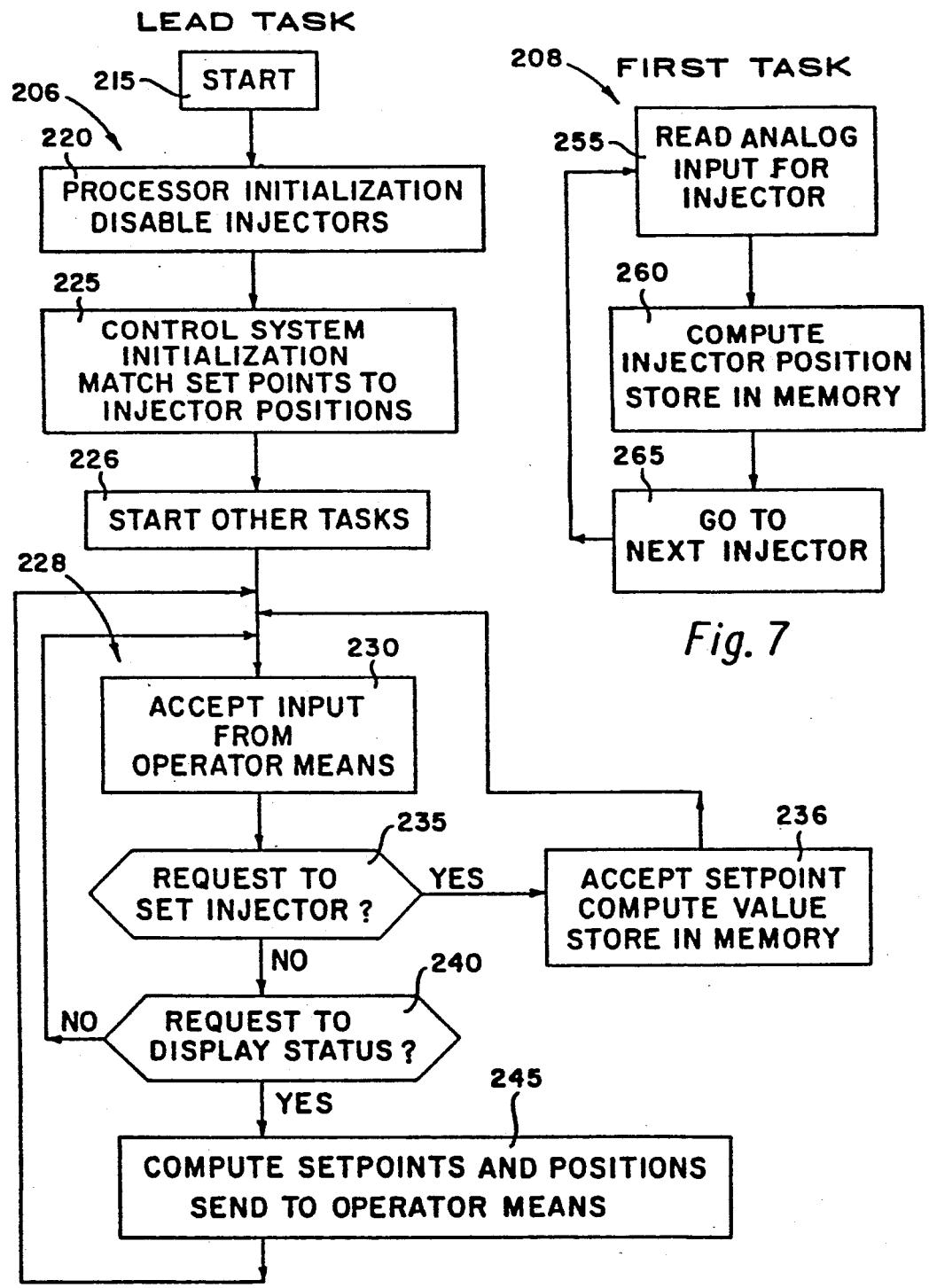

FIG. 6 illustrates the methodology of the lead task 206. Generally speaking, the lead task 206 initializes the control system 20, starts the other tasks, and handles communications between the processor means 25 and the operator means 70.

FIG. 7 illustrates the methodology of the first task 208. Generally speaking, the first task 208 accesses the analog input board 210. The analog input board 210 is connected to each capacity measuring means 60. The analog input board receives the capacity signal for each adjustment means 55 from the capacity measuring means 60, converts the analog value of the signal to a digital capacity signal, and stores the digital capacity signal in memory for use by the other tasks.

Figure 8:
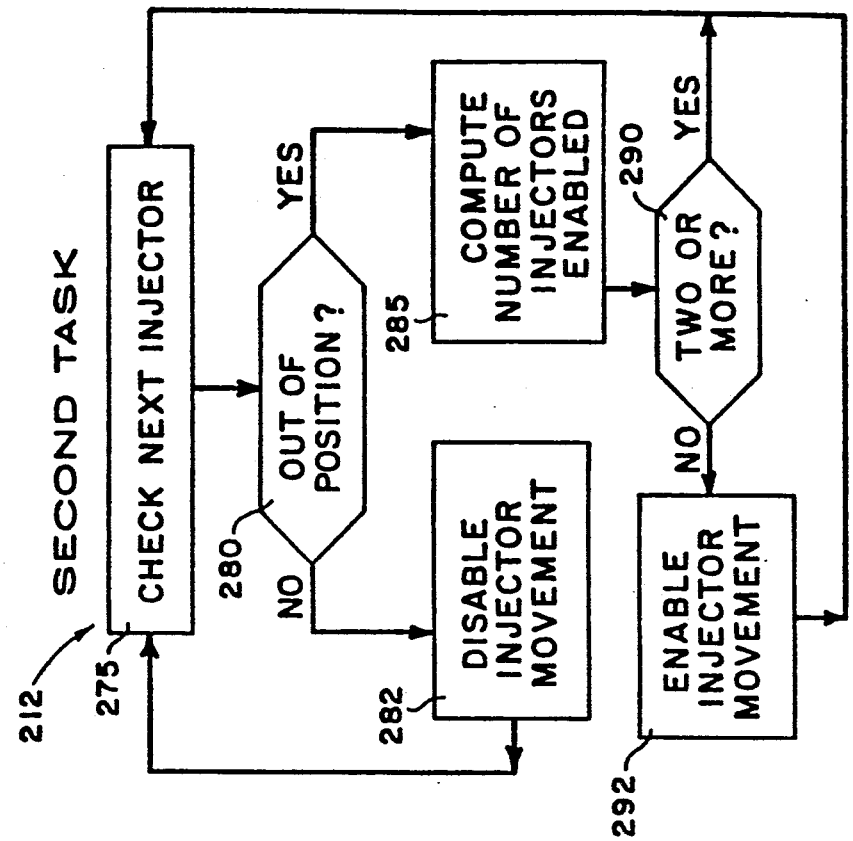
FIGS. 6, 7, and 8 are flow charts illustrating an embodiment of the control method executed by the control system of FIG. 1.

FIG. 8 illustrates the methodology of the second task 212. Generally speaking, the second task 212 compares the value of the feed set point signal to the value of the digital capacity signal for the adjustment means 55/injector 40. If the two signals differ by more than a preselected amount, task 212 checks to see how many driver means 35 are enabled to provide a drive signal to other adjustment means 55. If no more than two other driver means 35 are enabled, the processor means 25 will enable the driver means 35 to adjust the adjustment means 55/injector 40 combination being addressed. If more than two driver means 35 are already enabled to run, the processor means 25 will leave the adjustment means 55/injector 40 combination being addressed out of position and proceed to check the position of the next adjustment means 55.

Referring now to FIG. 6, the processor means 25 and the lead task 206 are rendered operative at a start step 215 when electrical power is supplied to the control system 20 through a key switch, equivalent power switching means (not illustrated), or simply plugging the control system 20 into a source of electrical power. Once the system 20 is "powered up" the lead task 206 proceeds from the start step 215.

At the processor initialization step 220, the processor means 25 sets constant values, stores them in memory, and sets the communication parameters for communications between the operator means 70 and the processor means 25. The processor initialization step also removes the driver designation signal from the gate means 65 and driver means 35 to disable the driver means 35 and prevent the adjustment means 55 from changing the volumetric injection capacity of the injectors 40 as the control system 20 is starting up. The processor intialization step 220 is executed on hardware reset, i.e., when the control system is powered up, or upon receiving a control "C" character from the operator means 70. The following is a reproduction of the program steps the processor means 25 uses to start up and to implement the processor initialization step:

1000 ' A-HED VER. 1.24 - Aug. 9, 1988, 10:30 AM
' H. E. ANDERSON CO.
1030 '
1060 ' Lead task
1070 ' Define variables
1080 ' INTEGER I,J,K,L,HIM,I2,J2,K2,L2, AIN,AOUT,CHN,CHIN, MAXHED,MTRBRD
1090 INTEGER HPOS(11),THP(11),HSP(11),MINSET,HDMSK(2)
1110 REAL X
1120 STRING IN$(86),S$(3,11)
1130  S$(0)="S1":  S$(1)="S2":  S$(2)="S3": S$(3)="S4"
1140  S$(4)="S5":  S$(5)="S6":  S$(6)="S7": S$(7)="S8"

1150 S$(8)="S9": S$(9)="S10": S$(10)="S11": S$(11)="S12"
1160 AIN=$E0: AOUT=$C0: WOUT=$50: MAXHED=0
1170 MINSET=34: '=5%
1180 '
1190 I=$B2: OUT I,12: OUT I,126: OUT I,13: OUT I,0: OUT $FF,$18: ' Baud & Mode
1200 '
1210 'Clear motor driver card enable bits
1220 FOR I=0 to 2
1230 HDMSK(I)=0: OUT ($80+I * $10),0
1240 NEXT I
©H. E. Anderson Company, 1988

At the control system initialization step 225, the processor means 25 defines variables and sets variables to the initial values, and requires the operator means 70 to input the number of injectors 40 which are to be controlled. As discussed supra, in the prototype system 20, each driver board 50 has four driver means 35 and thus can adjust four adjustment means 55 for four injectors 40. In the prototype system 20, the driver designation signal identifies the individual driver means 35 by their location on the driver board 50 and by the driver board's location in the STD card cage, e.g., the four driver means 35 on the driver board 50 in the first position in the card cage are identified as driver means 1, 2, 3, 4; the four driver means 35 on the driver board 50 in the second driver board position in the STD card cage are identified as driver means 5, 6, 7, 8; etc. If it is desired to adjust injector 40 in the ninth position, at the control system initialization step 225 the operator means 70 must tell the processor means that at least nine injectors 40 are to be controlled, which will allow, but not require, adjustment of the first nine driver means 35/adjustment means 55/injectors 40 combinations, i.e., any of the injectors 40 corresponding to the first nine positions in the card cage may be adjusted.

After the number of injectors 40 to be controlled is input at step 225, the processor means 25 then reads the capacity signal from the selected injectors 40. The capacity signal is read directly from the capacity measuring means or potentiometer 60 via the analog input board 210. In the prototype system 20, the analog input board 210 has separate channels, one channel assigned and hardwired to each potentiometer 60. In the prototype system 20, the analog input board 210 is a Microlink model no. STD-081 which will accept eight analog inputs, therefore one analog input board 210 is used for each eight injectors 40. The analog input board 210 takes the capacity signal from the potentiometer 60 in analog voltage form and converts the analog capacity signal to a digital capacity signal. The processor means 25 takes the digital capacity signal and processes it as necessary to store it in Random Access Memory 46 as a percentage of the range of adjustment of the adjustment means 55. The processor means 25 accepts the feed signal from the operator means as a percentage of the range of the adjustment means 55, i.e., between 0 and 100 percent. The analog capacity signal and drive signal operate at an elevated range, e.g., 1-5 vdc, 10-50 madc, etc., and the processor means 25 must compensate for this "offset" between the signals the processor means 25 uses internally (0-100%) and the elevated signal ranges used for communication between the driver means 35 and adjustment means 55.

For purposes of the control system initialization step 225, the processor means 25 then takes the digital capacity signals for each injector 40 and enters the signals in memory as set points for the adjustment means 55/injector 40 from which the capacity signal was obtained. This matches the value of the feed set point signal to the value of the capacity signal for each injector 40/adjustment means 55 combination so that the control system 20 will start up in a steady state in which none of the injectors 40 are being adjusted. The control system initialization step 225 is only executed on hardware reset (when the system is powered up) or software reset (receiving "RESET" from operator means 70).

It is a safety feature of the lead task 206 that both the processor initialization step 220 and the control system initialization step 225 are reexecuted on hardware reset, i.e., when the control system 20 is powered up. The control system 20 includes means for providing operational power for the system 20. In the prototype system 20 the system 20 uses a power supply board as a means for providing power, since the STD BUS system includes a power bus. The system 20 also includes means for applying and removing the system 20 from the operational power means. The system 20 may be disconnected from operational power using the operator means 70 or by disconnecting the system from the operational power source, e.g., unplugging the system 20. As discussed supra, the processor initialization step 220 removes the driver designation signal from the gate means 65 to disable the driver means 35, i.e., the processor initialization step 220 includes reset means for disabling the driver means 35 when the operational power is applied after having been removed. The processor means 25, through control system initialization step 225, effects initialization means for receiving the capacity signal and the feed set point signal and for enabling the disabled driver means 35 after setting the feed set point signal about equal to the capacity signal. This is a safety feature of lead task 206 in that any time power is lost or turned off the volumetric injection capacities of the injectors 40 is not adjusted, i.e., the feed set point signal is set equal to the capacity signal, until new set points are entered into the operator means 70. This minimizes the possibility of the system starting up with injectors 40 injecting chemical at an undesirable rate.

At the start other tasks step 226, the processor means 25 starts the First and Second Tasks 208, 212 running simultaneously with the Lead Task 206. A reproduction of the program utilized by the processor means 25 to implement the control system initialization step 225 and step 226 follows:

1280 ' Max. head entry - Reset reentry point
1290 '
1300 PRINT "MAX. # HEADS=";MAXHED
1310 PRINT "ENTER MAX. HEADS: ";
1320 INPUT I
1330 IF I>12 THEN GOTO 1350
1340 IF I>=0 THEN GOTO 1360
1350 PRINT "ERROR-": GOTO 1310
1360 MAXHED=I
1370 '
1380 ' Set head setpoints to head positions
1390 '
1400 AIN-$E0
1410 FOR CHN=0 TO MAXHED - 1
1420 OUT AIN,CHN: ' Initialize A/D board-free run, channel CHN
1430 WAIT 100
1440 CHIN=INP(AIN+1): ' Input high order bits
1450 IF CHIN<$80 THEN GOTO 1440

1460 CHIN=CHIN * 256+INP(AIN): ' Shift hi order & input low order bits
1470 CHIN=BAND(CHIN,$FFF): ' Strip hi 4 bits
1480 HPOS(CHN)=(CHIN/15.22) - 2.3: ' Compute position #
1490 HSP(CHN)=HPOS(CHN)
1500 OUT AOUT+C:IN,HSP(CHN)
1510 NEXT CHN
1530 'Start other tasks
1540 RUN 1,10
1550 RUN 2,100

©H. E. Anderson Company, 1988

Once steps and 226 have been completed, the lead task 206 moves into a communication loop, generally designated 228, with the operator means 70. The lead task 206, stays in this communication loop unless a control "C" character is received from the operator means 70, or the system 20 loses power and is powered back up ("hardware reset"), or unless a "RESET" signal is received from the operator means 70, any of which reset the system and start at least a part of the initialization steps 220, 225 as discussed supra.

At the accept input step 230, the processor means 25 accepts input from the operator means 70. In the prototype program, at the beginning of accept input step 230 the controller 35 is initialized and is waiting for instructions from the operator means 70. Entering a carriage return character on the keyboard of operator means 70 results in the following display:

HELLO—ANDERSON INJECTOR CONTROL SYSTEM The controller 45 or processor means 25 then waits for more input. Here there are three acceptable operator inputs: *D, which causes the controller 45 to display the existing set points; *SI, which allows the operator means 70 to enter a new set point for any or all of the injectors 40; *BYE, which returns the program to the the beginning accept input step 230.

If an *D is entered the controller displays the set points in a three column format as follows:

| HEAD | SET POINT | POSITION |
|------|-----------|----------|
| 1    | 35        | 45       |
| 2    | 25        | 25       |
| 3    | 75        | 75       |
| 4    | 40        | 50       |
| 5    | 37        | 37       |

This is an abbreviated listing. The numbers in the left column represent the position of the driver means 35 in the STD card cage, i.e., the injector 40 associated with driver means 35 in the number 1 position has a set point of 35% of full scale. As discussed supra, the driver means 35/injector 40 combinations are identified by their position in the STD card cage, i.e., driver means 35/injector 40 in positions 1, 2, 3, and 4 are the four driver means 35 on the driver board 52 in the first position in the STD card cage, driver means 35/injector 40 combinations identified as 5, 6, 7, 8 in the display are the four driver means 35/injector 40 combinations on the driver board 52 in the second position in the STD card cage, etc. The set points are displayed as a percentage of full scale. After a reset sequence they correspond to the actual mechanical set point positions of the potentiometer 60 shown in the third column. If a new feed set point signal has been sent by the operator means 70, the set point column corresponds to the feed set point signal stored in Random Access Memory and not necessarily the actual position. The position column displays the position of each potentiometer 60 currently stored in memory by the first task 208.

To enter a new set point for any or all of the injectors 40 the symbols *SI are entered at the beginning of the accept input step 230. The controller 45 will respond with:

READY
*_____

The operator means 70 may then enter set points by typing the injector 40 number and an integer number between 5 and 100 representing the percentage of full scale of the injector's adjustable range at which it is desired to be set. To enter a set point the operator would enter:
*S1 35
which requests that the injector 40 associated with the driver means 35 in the first position on the first driver board 52 in the STD card cage be set at 35 percent of full scale. Once the program has executed this command it will return by displaying the word "DONE". At this point the operator may enter a set point for another injector 40, may display all of the set points by entering "*D" or may return to the beginning of the accept input step 230 by entering "*BYE".

At discrimination step 235, the processor means 25 determines whether the input from the operator means 70 is a request to adjust an injector 40. If the answer to discrimination step 235 is yes, at the accept set point step 236 the processor means accepts the feed signal from the operator means 70, which is in the form of a percentage of full scale, i.e., a percentage of the full scale of the adjustable range of the injector's volumetric injection capacity, converts it to a digital representation of the feed signal compatible with the voltage or current range used to adjust stop means 145 full scale ("feed set point signal"), and stores the feed set point signal in Random Access Memory for use by the second task 212. At the accept set point step 236, the processor means 25 also sends the feed set point signal to the analog output board 238. The analog output board 238 has separate channels, one channel assigned and hard-wired to each driver means 35. The analog output board 238 receives the feed set point signal from the processor means 25 and stores the feed set point signal in some form of memory, such as a J-K flip flop (not illustrated). The analog output board converts the digital feed set point signal from the processor means 25 to an analog voltage feed set point signal and continously outputs the analog feed set point signal to the driver means 35 until the value of the digital feed set point signal is changed by the processor means 25.

In the prototype system 20, the analog output board 238 is an Applied Micro Technology model no. ST4305 which has eight analog output channels, i.e., it will accept eight digital inputs for eight different output channels and output eight corresponding analog outputs. Therefore one analog output board 238 is used for each eight adjustment means 55, i.e., each analog output board 238 will receive eight digital feed setpoint signals and output eight corresponding analog feed set point signals.

If the result of discrimination step 235 is no, at discrimination step 240 a determination is made as to whether the input from the operator means 70 was a request to display the status of the injector positions. If the answer to discrimination step 240 is no, the lead task returns to accept input step 230. If the answer to discrimination step 240 is yes, at compute set points step 245 the processor means 35 converts the digital capacity signals and digital feed set point signals stored in memory to a percentage of full scale value and sends them to the operator means 70 for display. A reproduction of the program utilized by the processor means 25 to implement the communication loop 228 follows:

```
1580 ' Terminal input routine
1590 '
1600 ' Wait for a key stroke
1610 I=KEY
1620 IF I><13 THEN GOTO 1610: Only a RETURN
     char. will be accepted
1630 PRINT "HELLO—ANDERSON INJECTOR
     CONTROL SYSTEM"
1640 PRINT "*":
1650 INPUT IN$
1660 IN$=CONCAT$(IN$,"XXXXXX")
1670 IF IN$><"DXXXXXX" THEN GOTO 1820
1680 '
1690 ' Dsplay set-points
1700 PRINT "HEAD SETPOINT POSITION"
1710 '
1720 FOR CHN=0 TO MAXHED - 1
1730 ' Calculate set-point as percentage of full scale
1740 X=(HSP(CHN) - 24)/2.16: K=X
1750 IF 10 * X - 10 * K>=5 THEN K=K+1
1760 X=(HPOS(CHN) - 24)/2.16: L=X
1770 IF 10 * X - 10 * K>=5 THEN L=L+1
1780 PRINT CHN+1,K,L
1790 NEXT CHN
1800 GOTO 1640
1810 '
1820 IF IN$><"SIXXXXXX" THEN GOTO 1640
1830 '
1840 ' Enter set-points
1850 '
1860 PRINT "READY—ENTER SETPOINT OR
     EXIT"
1870 PRINT "*"
1880 INPUT IN$
1890 IN$=CONCAT$(IN$, "XXX")
1900 FOR I=0 TO MAXHED - 1
1910 IF MID$(IN$,1,3)=S$(I) THEN GOTO 1990
1920 NEXT I
1930 IF IN$="EXITXXX" THEN GOTO 1640
1940 PRINT "ERROR"
1950 GOTO 1860
1960 '
1970 ' Compute & output setpoint to analog board
1980 '
1990 IF I<9 THEN X=VAL(MID$(IN$,4,3))
2000 IF I>=9 THEN X=VAL(MID$(IN$,5,3))
2010 J=X
2020 IF J<5 THEN GOTO 1940
2030 IF J>100 THEN GOTO 1940
2040 HSP(I)=(2.16 * J)+24.
2050 OUT AOUT+I,HSP(I): PRINT "DONE":
     GOTO 1870
2060 '
2430 IF IN$="RESETXXXXXX" THEN GOTO
     1300
2440 IF IN$><"BYEXXXXXX" THEN GOTO
     2450
2442 WAIT 750: PRINT "+++";
2444 WAIT 750: PRINT "ATHO": GOTO 1610
2450 PRINT "ERROR": GOTO 1640
2460 '
```

©H. E. Anderson, 1988

The lead task 206 and programming just described are designed for interfacing with a human operator, i.e., to prompt and communicate with a human being through operator means 70. Although the basic concepts would be the same and there would be great similarities, the lead task 206 and its programming will need modification for exclusive communication with and control by another computer.

Referring to FIG. 7, the first task 208 is initiated upon enablement by the start other tasks step 226 of the lead task 206. At the read analog input step 255, the processor means 25 reads the volumetric injection capacity of each injector 40 through analog input board 210. The analog input board 210 has individual channels, with a channel connected (hardwired) to each capacity measuring means or potentiometer 60 on each injector 40. At the compute head position step 260, the analog input board 210 converts the capacity signal from an analog voltage form to an equivalent digital capacity signal. The processor means 25 takes the digital capacity signal and stores it in Random Access Memory 46. At go to next injector step 265, after storing the digital capacity signal in memory, the processor means 25 goes to the next injector capacity measuring means 60, i.e., the next channel or the analog input board 210, and repeats the first task 208. The first task 208 repetitively goes through all of the capacity measuring means 60, reading the volumetric injection capacities of the injectors 40, and continually updating the capacity signals stored in the Random Access Memory 46 of processor means 25. A reproduction of the program utilized by the processor means 25 to implement the First Task 208 follows:

```
2470 ' TASK #1 - Scan and compute head positions
2480 '
2490 TASK 1
2500 FOR CHN=0 TO MAXHED - 1
2510 OUT AIN,CHN: ' Initialize A/D board-free run,
     channel CHN
2520 WAIT 100
2530 CHIN=INP(AIN+1): ' Input high order bits
2540 IF CHIN<$80 THEN GOTO 2530
2550 CHIN=CHIN * 256+INP(AIN): ' Shift hi order
     & input low order bits
2560 CHIN=BAND(CHIN,$FFF): ' Strip hi 4 bits
2570 HPOS(CHN)=(CHIN/15.22) - 2.3: ' Compute
     position #
2580 NEXT CHN
2590 EXIT
2600 '
```

©H. E. Anderson Company, 1988

Referring to FIG. 8, just as the first task 208, the second task 212 is enabled by the start other tasks step 226 of the lead task 206. The second task 212 is a continuous loop in which the Processor means 25 continuously checks the positions (i.e., the volumetric injection capacity as defined by the capacity signal) of the adjustment means 55, compares the position to the feed set point signal, and adjusts the adjustment means 55 as necessary to match the volumetric injection capacity (capacity signal) to the feed set point signal. The second task 212 continuously cycles through all of the adjustment means 55/ injectors 40, comparing them one at a time to their designated feed set point signal.

At the check next injector step 275, the processor means 25 accesses the digital capacity signal and the digital percentage feed set point signal for the next injector 40 which have been stored in memory by the lead task 206 and first task 208. At the out of position step 280, the processor means 25 discriminates as to whether the adjustmer.. means 55/injector 40 is out of position, i.e., whether the difference between the capacity signal and the feed set point signal is outside of a preselected range. If the injector 40 is not out of position, at disable injector movement step 282, the processor means 25 disables the associated driver means 40 so that the volumetric injection capacity of the injector 40 cannot be adjusted. The processor means 25 then returns to step 275 to check the next injector 40. If the adjustment means 55 being checked is out of position, i.e., if the result of discrimination step 280 is yes, the processor means 25, at the compute number of injectors enabled step 285 determines how many driver means 35 are currently enabled to generate drive signals. In the preferred method, this step is accomplished by checking memory and determining how many driver means 35 have been enabled, i.e., have been sent an enabling driver designation signal. (Each time the processor means 25 checks the position of an adjustment means 55/ injector 40, the processor means 25 stores in Random Access Memory whether the associated driver means 35 received an enabling driver designation signal.)

At discrimination step 290, the processor means 25 discriminates as to whether more than two driver means 35/injectors 40 are currently being enabled. If the result of this discrimination is yes, the processor means returns to step 275 and checks the position of the next injector. In other words, with the second task 212 and discrimination step 290 the processor means 25 provides a means for limiting the number of simultaneously enabled driver means 35 to two. The purpose of step 290 is to limit the amount of power drawn at one time by the control system 20. This step may be eliminated if power consumption is not a concern and the number of driver means 35 allowed to provide drive signals at one time may be varied to meet the requirements of a specific situation. If the result of discrimination step 290 is no, i.e., if less than two driver means 35/injectors 40 are enabled, at enable injector step 292, the processor means 25 enables the appropriate driver means 35 to reposition the adjustment means 55/injector 40 whose position is being checked by sending a driver designation signal to the driver means 35. The processor means 25 then returns to step 275 to check the position of the next injector as prescribed by the methodology of the second task 212. A reproduction of the program utilized by the processor means 25 to implement the second task 212 follows:

```
2610 'TASK #2 - Position heads
2620 '
2630 TASK 2
2640 FOR I2=0 TO MAXHED - 1
2650 MTRBRD=$80+((I2/4) * $10): ' Set motor board address
2660 IF HPOS(I2) - HSP(I2)>5 THEN GOTO 2720
2670 IF HSP(I2) - HPOS(I2)< =5 THEN GOTO 2900
2680 '
2690 IF HSP(I2)<MINSET THEN HSP(I2)=MINSET
2700 ' Enable head if less than 2 are moving
2710 ' Calculate # of heads moving
2720 HIM=0
2730 OR J2=0 TO 2
2740 IF BAND (HDMSK(J2),$1)> <0 THEN HIM=HIM+1
2750 IF BAND (HDMSK(J2),$2)> <0 THEN HIM=HIM+1
2760 IF BAND (HDMSK(J2),$4)> <0 THEN HIM=HIM+1
2770 IF BAND (HDMSK(J2),$8)> <0 THEN HIM=HIM+1
2780 NEXT J2
2790 IF HIM> =2 THEN GOTO 2960
2800 '
2810 ' Set head mask to enable head
2820 J2=I2 - ((I2/4) * 4): L2=1
2830 IF J2=0 THEN GOTO 2850
2840 FOR K2=1 to J2: L2=L2 * 2: NEXT K2
2850 J2=I2/4: HDMSK(J2)=BOR(HDMSK(J2),L2)
2860 OUT MTRBRD,HDMSK(J2)
2870 GOTO 2960
2880 '
2890 ' Clear head mask bit for pumphead
2900 J2=I2 - ((I2/4) * 4): L2=1
2910 IF J2=0 THEN GOTO 2930
2920 FOR K2=1 to J2: L2=L2 * 2: NEXT K2
2930 L2=BXOR(L2,$F)
2940 J2=I2/4: HDMSK(J2)=BAND(HDMSK(J2),L2)
2950 OUT MTRBRD,HDMSK (J2)
2960 NEXT I2
2970 EXIT
END
```

©H. E. Anderson Company, 1988

Referring to example FIGS. 2 and 3B, in the preferred embodiment, the processor means 25 and second task 212 enable driver means 35 to adjust the volumetric injection capacity of an injector 40 using the circuitry of the driver board 52. In the preferred embodiment, each driver board 52 includes four driver means 35A, 35B, 35C, 35D, one driver means for driving each of four adjustment means 55A, 55B, 55C, 55D. The number of driver means 35 may be increased or decreased with corresponding changes to the driver board circuitry 52 or by using a different type of board 52. In the preferred control system 20, multiple driver boards 52 are used if it is desired to have driver means 35 for adjusting more than four adjustment means 55 and injectors 40. FIG. 2 exemplifies the use of two driver boards 52 to adjust eight adjustment means 55.

As discussed supra, the processor means 25 generates a drive designation signal associated with the feed set point signal for designating the drive means 35 to receive the feed set point signal. Referring to FIG. 3A, the processor means 25 sends a drive designation signal to gate means 65 designating the driver means 35A-D to be enabled. Preferably gate means 65 includes input nand gates 295A, 295B, 295C, and 295D and the driver designation signal must enable or turn on the appropriate input gate(s) 295A-D to enable the corresponding driver means 35A-D. In the prototype controller 45, the driver designation signal includes four parallel binary signals, one signal applied to each of the bus terminals B7, B9, B11, B13 connected to input nand gates 295A-D.

As discussed supra, since the prototype controller 45 uses multiple boards (e.g., processor means 25, driver boards 52, analog input board 210, analog output board 238, etc.) which communicate on a common bus system 49, the board communications on the bus 49 must be timed and controlled. Processor means 25 controls which board or boards are enabled to communicate and at what time they are enabled to communicate by systematically addressing and enabling each board to communicate on the bus 49. The operation of the bus system is described in detail in the STDMG STD BUS specification and practice, Section 1, which is incorporated herein by reference thereto.

The following discussion uses driver board 52 as an example of how the processor means 25 controls communications on the STD BUS system and also explains the operation of the driver board 52, which was developed by the inventor. Referring to FIG. 3A, the processor means 25 enables driver board 52 to communicate using decoder circuits 300, 305 and decoder and gates 310, 315. The decoder circuits 300, 305 require an address signal from the Processor means 25 to enable the driver board 52 to communicate. (Each of the boards, including the analog input boards 210, analog output board 238, etc., require a unique address signal from the processor means 25 to enable the board to communicate on the bus 49.) On the driver boards 52, the address signal required by decoder circuits 300, 305 is determined by the presence or absence of jumpers (not illustrated) across the decoder terminals 320, 325. When the processor means 25 wishes to communicate with the driver board 52, it provides the driver designation signals on bus terminals B7, B9, B11, B13 to input nand gates 295A-D. This driver designation signal is applied to all boards, including the other driver boards 52 in the controller 45. To specify which driver board 52 is to receive the drive designation signal, the processor means 25 sends the address signal enabling the desired driver board 52 to the decoder circuits 300, 305 via bus terminals B15, B17, B19, B21, B23, B25, B33.

On receipt of the appropriate address signal, the decoder circuits 300, 305 send an enabling signal to decoder and gates 310, 315. If the processor means 25 wishes to receive communications from the driver board 52 or allow communications from the driver board 52 to other boards or components on the bus system, it sends a read signal to bus terminal B32 of decoder and gate 310 which, together with the enabling signal from the decoder circuits 300, 305, allows gate 310 to send an enabling signal to enable amplifier 330. When enabled, amplifier 330 allows signals or communications to pass from driver board 52 to the bus 49 via terminal B8.

If the processor means 25 wishes to send the driver designation signals present at terminals B7, B9, B11, and B13 to the driver board 52, the processor means sends the appropriate address signal to decoder circuits 300, 305 via common bus terminal B33 and a write signal to terminal B31 of decoder and gate 315. The presence of an enabling signal from the decoder circuits 300, 305 and the enabling write signal at the input terminals of gate 315 enables gate 315 to output an enabling signal to the input nand gates 295A-D. The presence of the enabling signal from and gate 315 and the presence of a driver designation signal at the input terminals to an input nand gate 295A-D enables the input nand gate 295A-D to output a driver designation signal to its' associated J-K flip flop 335A, 335B, 335C, 335D. Inverters 332A, 332B, 332C, 332D invert or reverse the binary value of the driver designation signal applied to the "J" terminal of flip flops 335A-D from the binary value of the output of input nand gates 295A-D applied to the "K" terminal of flip flops 335A-D. When decoder and gate 315 is enabled, it also outputs an enabling signal to the clocks of J-K flip flops 335A-D which allows the J-K flip flops to receive the driver designation signals.

The J-K flip flops 335A-D provide a means for maintaining enablement of the driver means 35 until the capacity signal is about equal to the feed set point signal, i.e., until the driver means has completed adjusting the adjustment means 55. The J-K flip flops 335A-D latch the driver designation signals into the receiving flip flop and continuously output an enabling signal once they have latched in a driver designation signal. This allows the driver board 52 to maintain the application of the driver designation signals to the designated drivers 35 after the processor means 25 has removed the address signal and drive designation signals from the input terminals of the driver board 52, which allows the processor means 25 to move on and communicate with other boards. The J-K flip flops 335A-D latch and output the driver designation signals until the driver board 52 receives an address signal from the processor means 25 without an enabling driver designation signal for the latched flip flops 335A-D, i.e., when an appropriate address signal is sent to a driver board 52 and gate 315 is enabled, any flip flop 335A-D which does not receive a drive designation signal from input nand gates 295A-D is reset (by the absence of a drive designation signal) to provide a disabling output to that flip flop's associated driver means 35A-D: Reset bus terminal B47 is used by the processor means to send a signal through amplifier 336 to reset the J-K flip flops 335A-D during the initialization steps 220, 225 of the lead task 206 discussed supra.

When the driver designation signal is latched into a J-K flip flop 335A-D, the J-K flip flop sends an enabling driver designation signal from its output to corresponding driver and gate 340A, 340B, 340C, 340D. The driver and gates 340A-D also receive an input from the comparator means 345 and if the output of the comparator means 345 is enabling, the driver and gate 340A-D receiving a driver designation signal will pass the driver designation signal through inverter 350A-D to enable the corresponding driver means 35A, 35B, 35C, 35D. The operation of the comparator means 345 is discussed in detail infra.

Referring to FIGS. 3A and 3B, the operation of a typical driver board 52 is further explained using the enablement of driver means 35A, which is typical of all driver means 35A-D, as an example. When the processor means 25 wishes to enable driver means 35A, it places an enabling signal on bus terminal B13. Bus terminal B13 and the signals thereon are common to all boards connected to the bus 49 and therefore the processor means 25 must further address the specific board to receive the signal on terminal B13. Processor means 25 does this by sending an address signal on common bus terminals B5, B17, B19, B21, B23, B25, B33 which uniquely addresses one driver board 52 and therefore passes an enabling signal through decoder circuits 300, 305 of the selected driver board 52 to decoder and gates 310, 315. Processor means 25 also applies a write signal at bus terminal B31 which, together with the enabling output from decoder circuits 300, 305 enables and gate 315. Enabled gate 315 sends an enabling signal to the input of input nand gate 295A which, together with the driver designation signal on terminal B13, enables input nand gate 295A. Enabled nand gate 295A provides an enabling driver designation signal to J-K flip flop 335A which, together with the enabling signal from decoder and gate 315 latches the driver designation signal into J-K flip flop 335A. As long as the driver designation signal is latched into J-K flip flop 335A, the flip flop outputs an enabling signal to driver and gate 340A. (The latched J-K flip flop 335A can be unlatched or reset by receipt of an enabling clock signal from decoder and gate 315 which is not accompanied by a driver designation signal from input nand gate 295A, or by a reset signal from the processor means 25 via bus terminal B47. Assuming driver and gate 340A is receiving an enabling signal from comparator means 345, the enabling driver designation signal from flip flop 335A enables driver and gate 340A to output an enabling driver designation signal through inverter 350A to the base of transistor 355A. The receipt of the driver designation signal at the base of transistor 355A turns the transistor on which applies power to servo circuit 360A. Servo circuit 360A receives the feed set point signal from the analog output board 238 via terminal CA1-1 and receives the analog capacity signal from potentiometer 60 via terminal CA2-6. The servo circuit 360A compares the analog capacity signal to the analog feed set point signal and outputs the drive signal via terminal CA2-7 or CA2-8 to drive the motor 150 of the adjustment means 55 until the capacity signal is approximately equal to or within a preselected range of the feed set point signal. The servo circuit 360 will drive the reversible motor 150 in either direction, i.e., to increase or decrease the volumetric injection capacity by repositioning the stop means 145 along the threads of shaft 165, as necessary to satisfy the feed set point signal. The servo circuit 360A may be effected using a computer program which may be programmed into the processor means 25, similar to the lead task 206, first task 208, and second task 212 described supra. Preferably the servo circuit is a commercially available servo chip. The prototype servo circuit 360A is a Motorola model no. MC33030.

Comparator means 345 is preferably used to implement the disabling means 160 discussed supra. As discussed supra, the preferred disabling means 160 is a pressure sensor 160 responsive to pressure in the complement chamber 95 of injector 40. The pressure sensor 160 generates an analog pressure signal indicative of the pressure in the complement chamber 95 or manifold 156. Reference means 365 is used for generating a reference signal indicative of a preselected pressure level. In the prototype control system 20, it is preferred that the volumetric injection capacity of the injector 40 only be adjusted when there is sufficient pressure in the complement chamber 95 to move the injection diaphragm 135 away from the second end 168 of stop means 145. When the complement chamber 95 is not pressurized by the carrier fluid source 151, spring 155 and the chemical pressure in injection chamber 90 force the injection diaphragm 135 into the stop means 145. The motor 150 does not have sufficient torque to move the second end 168 of the stop means 145 and the injection diaphragm 135 against the force of spring 155 and the chemical pressure in injection chamber 90 and any attempt at such motion may result in overloading and damaging the motor 150 or in damaging wear to the clutch assembly 175.

The reference means 365 is preferably an adjustable voltage input, such as a potentiometer, having a range conforming to the range of the pressure sensor 160. The reference means 365 is adjusted to provide a reference signal equal to or greater than the minimum pressure level in the complement chamber 95 necessary to shift the injection diaphragm 135 away from the stop means 145. The comparator means 345 compares the pressure signal to the reference signal and sends a disabling signal to the driver and gates 340A-D when the pressure signal is indicative of a pressure below the preselected pressure level as indicated by the reference signal, e.g., the pressure signal is of lesser value than the reference signal.

In the prototype controller 45, the output of the comparator means 345 is used by all driver boards 52, i.e., the comparator means 345 is only present on one driver board 52. The output of the one comparator means 345 is applied to all driver boards via bus terminal B6. In the prototype controller 45, the output of the comparator means is also received by the processor means 25 through amplifier 330 and bus terminal B8. The processor means 25 monitors the output of comparator means 345 to know when carrier fluid is flowing from the carrier fluid source 151 and when the injectors 40 are operating.

Referring to example FIGS. 1 and 2, the controller 45 and processor means 25 together with the output of the comparator means, may be used to control the flow of the carrier fluid from the carrier fluid source 151. In the preferred embodiment the carrier fluid is irrigation water and the processor means 25 uses irrigation control board 370, exemplified in FIG. 2, to control the opening and closing of irrigation valve 375, exemplified in FIG. 1.

Referring to example FIG. 3A, the driver boards 52 include a five volt direct current (5 vdc) power supply circuit 380 and twelve volt direct current (12 vdc) power supply circuit 385. The STD BUS 49 supplies 5 vdc to circuit 380 on bus terminal B1 and supplies 12 vdc to circuit 385 on bus terminal B55. The driver boards 62 also include an eight volt direct current (8 vdc) circuit 390. The 8 vdc circuit takes 12 volts from the 12 vdc circuit 385 and regulates it to 8 vdc using regulator 395.

The following is a tabulation of the preferred components of the driver board 50:

| COMPONENT | MANUFACTURER | MODEL NO. |
|---|---|---|
| Decoder Circuits 300, 305 | Industry Standard | 74LS42 |
| Input Nand Gates 295A-D | Industry Standard | 74LS00 |
| Amplifier 330 | Industry Standard | 74LS126 |
| J-K Flip Flops 335A-D | Industry Standard | 74LS73 |
| Decoder And Gates 310, 315 | Industry Standard | 74LS02 |
| Driver And Gates 340A-D | Industry Standard | 74LS02 |
| Inverters 350A-D | Industry Standard | 7406 |
| Servo Circuit 360A-D | Motorola | MC33030 |
| Comparator Means 345 | Industry Standard | LM-111 |
| Regulator 395 | Industry Standard | 7808 |
| Inverters 332A-D | Industry Standard | 74LS04 |
| Transistors 335A-D | Motorola | MPSU55 |

(Referring to FIGS. 3A and 3B, unless otherwise indicated herein, the values of all resistors on the driver boards 52 is given in ohms and the value of capacitors is given in microfarads.

To further assist the reader in understanding the operation and interconnection of the driver board 52 with the other components of the control system 20, the following tabulation of the driver board's input and output terminals is provided:

| BUS TERMINAL NO. | INPUT/OUTPUT DESCRIPTION |
|---|---|
| B1 | +5 VDC logic power |
| B2 | +5 VDC logic power |
| B3 | Logic ground |
| B4 | Logic ground |
| B6 | Pressure signal from comparator means 345 to bus 49 |
| B7 | Driver designation signal input |
| B8 | Comparator means 345 output to processor means 25 |
| B9 | Driver designation signal input |
| B11 | Driver designation signal input |
| B13 | Driver designation signal input |
| B15 | Address signal input |
| B17 | Address signal input |
| B19 | Address signal input |
| B21 | Address signal input |
| B23 | Address signal input |
| B25 | Address signal input |
| B31 | Write signal from processor means indicating that the bus holds or will hold valid data to be written to the addressed memory or output device |
| B32 | Read signal from the processor means 25 which indicates that the processor means needs to read data from the addressed memory or input device |
| B33 | Input/Output request signal from the processor means which is gated with either a read signal or a write signal to designate input or output operations |
| B47 | System reset signal |
| B53 | Auxiliary ground |
| B54 | Auxiliary ground |
| B55 | +12 vdc power supply |

| TERMINAL STRIP NO. | INPUT/OUTPUT DESCRIPTION |
|---|---|
| CA1-1 | Feed set point signal to driver means 35A from analog output board 238 |
| CA1-2 | Ground |
| CA1-3 | Feed set point signal to driver means 35B from analog output board 238 |
| CA1-4 | Ground |
| CA1-5 | Feed set point signal to driver means 35C from analog output board 238 |
| CA1-6 | Ground |
| CA1-7 | Feed set point signal to driver means 35D from analog output board 238 |
| CA1-8 | Ground |
| CA2-1 | Pressure sensor 160 power supply |
| CA2-2 | Ground |
| CA2-3 | Pressure signal input to comparator means 345 |
| CA2-4 | Interrogation signal (12 volt power supply) to potentiometer 60A |
| CA2-5 | Ground for potentiometer 60A |
| CA2-6 | Capacity signal from potentiometer 60A to driver means 35A |
| CA2-7 | Drive signal to adjustment means 55A (clockwise) |
| CA2-8 | Drive signal to adjustment means 55A (counterclockwise) |
| CA2-10 | Interrogation signal (12 vdc) to potentiometer 60B |
| CA2-11 | Ground for potentiometer 60B |
| CA2-12 | Capacity signal from potentiometer 60B to driver means 35B |
| CA2-13 | Drive signal from driver means 35B to adjustment means 55B (clockwise) |

-continued

| TERMINAL STRIP NO. | INPUT/OUTPUT DESCRIPTION |
|---|---|
| CA2-14 | Drive signal from driver means 35B to adjustment means 55B (counterclockwise) |
| CA2-16 | Interrogation signal (12 vdc) to potentiometer 60C |
| CA2-17 | Ground for potentiometer 60C |
| CA2-18 | Capacity signal from potentiometer 60C to driver means 35C |
| CA2-19 | Drive signal from driver means 35C to adjustment means 55C (clockwise) |
| CA2-20 | Drive signal from driver means 35C to adjustment means 55C (counterclockwise) |
| CA2-22 | Interrogation signal (12 vdc) to potentiometer 60D |
| CA2-23 | Ground for potentiometer 60D |
| CA2-24 | Capacity signal from potentiometer 60D to driver means 35D |
| CA2-25 | Drive signal from driver means 35D to adjustment means 55D (clockwise) |
| CA2-26 | Drive signal from driver means 35D to adjustment means 55D (counterclockwise) |
| CA3-1 | Signal ground |
| CA3-2 | Capacity signal from potentiometer 60A to analog input board 210 |
| CA3-3 | Capacity signal from potentiometer 60B to analog input board 210 |
| CA3-4 | Capacity signal from potentiometer 60C to analog input board 210 |
| CA3-5 | Capacity signal from potentiometer 60D to analog input board 210 |
| CA3-6 | Signal Ground |

Terminal strip CA3 and resistors 400A-D and resistors 405A-D are provided to accommodate the input requirements of the prototype analog input board 210, i.e., Microlink model no. STD-081. The resistors 400A-D and 405A-D create a voltage divider and reduce the voltage of the capacity signal from the potentiometers 60A-D to a range acceptable by the analog input board 210. Terminal strip CA3 and resistors 400A-D, 405A-D may be eliminated by the use of a different analog input board 210.

While the invention has been described with a certain degree of particularity, it is manifest that many changes may be made in the details of construction and the arrangement of components without departing from the spirit and scope of the disclosure. It is intended to be understood that the invention is not limited to the embodiments set forth herein for purposes of exemplification, but is to be limited only by the scope of the attached claim or claims including the full range of equivalency to which each element thereof is entitled.

What is claimed is:

1. A device for adjusting the volumetric capacity of a chemical injector in response to receiving a drive signal from a remote controller, the injector including a cylinder-like housing having a cavity and a reciprocal piston-like element dividing the cavity into an injection chamber and a complement chamber, the adjusting device comprising:

stop means, located in the path of reciprocal motion of the piston-like element, for limiting the reciprocal motion and thereby limiting the available volume of the injection chamber and the volumetric injection capacity of the injector;

power means, responsive to the drive signal, for controlling the position of the stop means with respect to the reciprocal piston-like element, along the path of reciprocal motion and thereby adjusting the volumetric injection capacity of the injector;

capacity measuring means for indicating the volumetric injection capacity of the injector and providing a capacity signal indicative of the volumetric injection capacity; and a clutch assembly connected between the power means and the stop means.

2. The device of claim 1 in which the capacity indicating means comprises:

a potentiometer connected to the power means.

3. The device of claim 1, wherein said capacity measuring means comprises means for generating a signal indicative of the position of the stop means with respect to the reciprocating piston-like element, thereby indicating the volumetric injection capacity of the injector.

4. A method for adjusting the volumetric capacity of a chemical injector in response to receiving a drive signal from a remote controller, the injector including a cylinder-like housing having a cavity and a reciprocal piston-like element dividing the cavity into an injection chamber and a complement chamber, the adjusting method comprising the steps of:

limiting the reciprocal motion and thereby limiting the available volume of the injection chamber and the volumetric injection capacity of the injector;

controlling, in response to the drive signal, the position of the stop means with respect to the reciprocating piston-like element, along the path of reciprocal motion;

adjusting via a clutch assembly the volumetric injection capacity of the injector; and measuring the volumetric injection capacity of the injector and providing a capacity signal indicative of the volumetric injection capacity.

5. A device for adjusting the volumetric capacity of a double-diaphragm pump in response to receiving a drive signal from a remote controller, the pump including a cylinder-like housing having a cavity and a reciprocal piston-like element dividing the cavity into an injection chamber and a complement chamber, the adjusting device comprising:

stop means, including an elongated bar having an end extending between the diaphragms of the double-diaphragm pump for limiting the reciprocal motion and thereby limiting the available volume of the injection chamber and the volumetric injection capacity of the injector;

power means, responsive to the drive signal, including an electric motor rotating a threaded shaft threadingly engaged with the other end of the elongated bar for controlling the position of the stop means with respect to the reciprocal piston-like element along the path of reciprocal motion and thereby adjusting the volumetric injection capacity of the pump;

capacity measuring means for indicating the volumetric injection capacity of the pump and providing a capacity signal indicative of the volumetric injection capacity.

6. The device of claim 5, wherein the elongated bar pivots about a point located between the shaft and the diaphragms of the double-diaphragm pump.

* * * * *